United States Patent [19]
Katsuna et al.

[11] Patent Number: 4,961,323
[45] Date of Patent: Oct. 9, 1990

[54] AUTOMOTIVE AIR CONDITIONER

[75] Inventors: Kiyoharu Katsuna, Anjo; Kenji Ogura, Kariya; Toshio Hirata, Anjo, all of Japan

[73] Assignee: Nippondenso Co., Ltd., Kariya, Japan

[21] Appl. No.: 342,082

[22] Filed: Apr. 24, 1989

[30] Foreign Application Priority Data

Apr. 25, 1988 [JP] Japan ................ 63-101589

[51] Int. Cl.$^5$ ............................................. B60H 1/32
[52] U.S. Cl. ......................................... 62/244; 62/198; 62/502
[58] Field of Search ................ 62/114, 198, 244, 498, 62/502

[56] References Cited

U.S. PATENT DOCUMENTS

| | | | |
|---|---|---|---|
| 2,794,329 | 6/1957 | Herrick | 62/115 |
| 2,938,362 | 5/1960 | Schwind | 62/149 |
| 4,580,415 | 4/1986 | Sakuma et al. | 62/502 |
| 4,624,114 | 11/1986 | Sakuma et al. | 62/502 |
| 4,722,195 | 2/1988 | Suzuki et al. | 62/502 X |
| 4,781,738 | 11/1988 | Fujiwara et al. | 62/114 X |
| 4,840,042 | 6/1989 | Ikoma et al. | 62/502 X |

*Primary Examiner*—William E. Tapolcai
*Attorney, Agent, or Firm*—Cushman, Darby & Cushman

[57] ABSTRACT

An automotive air conditioner uses a non-azeotropic mix-type refrigerant of a higher boiling point refrigerant and a lower boiling point refrigerant. The automotive air conditioner changes its cooling capacity by varying the proportion of the lower boiling point refrigerant and the higher boiling point refrigerant. In order to madulate the proportion of the refrigerant, the present heat exchanger employs a rectifying means and a cooling means. The cooling means introduces the refrigerant circulating in the refrigerant circuit as the cooling medium when the air conditioner is not required high cooling capacity, so that lower boiling point refrigerant is separated and is stucked within the cooling means within a short while.

10 Claims, 6 Drawing Sheets

4,961,323

AUTOMOTIVE AIR CONDITIONER

FIELD OF THE INVENTION

The present invention relates to an automotive air conditioner for cooling and/or dehumidifying of the automotive compartment.

BACKGROUND OF THE INVENTION

A refrigerant circuit in which more than one type of refrigerant, the boiling points of which are different from each other (non-azeotropic mix-type refrigerant) is circulated has been used as the refrigerant circuit of a residential heat pump apparatus. The conventional type of refrigerant circuit using the non-azeotropic mixed-type refrigerant is not required to separate the mixed-type refrigerant in a short period. Because the switching condition from the cooling operation to the heating operation or from the heating operation to the cooling operation of the residential heat pump apparatus usually occurs only a few times during a year.

SUMMARY OF THE INVENTION

An object of the present invention is to provide a refrigerant circuit using a non-azeotropic mix-type refrigerant for varying the capacity of the refrigerant circuit.

Another object of the present invention is to provide a refrigerant circuit for an automotive air conditioner, the refrigerant circuit can vary the proportion of the non-azeopropic mix-type refrigerant within a short period.

Another object of the present invention is to provide a refrigerant circuit for an automotive air conditioner having a separating means for separating the non-azeotropic mix-type refrigerant, a rectifying means and a cooling means, the faculty of the cooling means is large enough for condensing a refrigerant within a short period.

A further object of the present invention is to provide a refrigerant circuit of an automotive air conditioner having a separating means including a cooling means, the cooling means operates during the condition when the automotive air conditioner is not required its high cooling capacity.

The above mentioned and further objects are explained hereinafter.

DETAILED DESCRIPTION OF THE PREFERRED EMBODIMENT

The preferred embodiment is explained hereinafter by referring the drawings.

Figure 1:
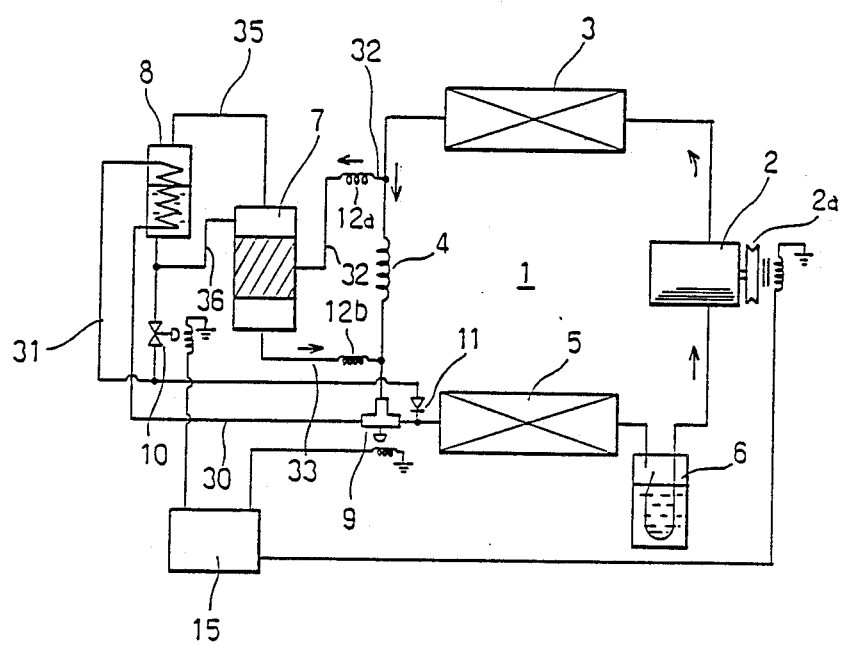
FIG. 1 is a diagram explaining a refrigerant circuit of the present invention.
Figure 2:
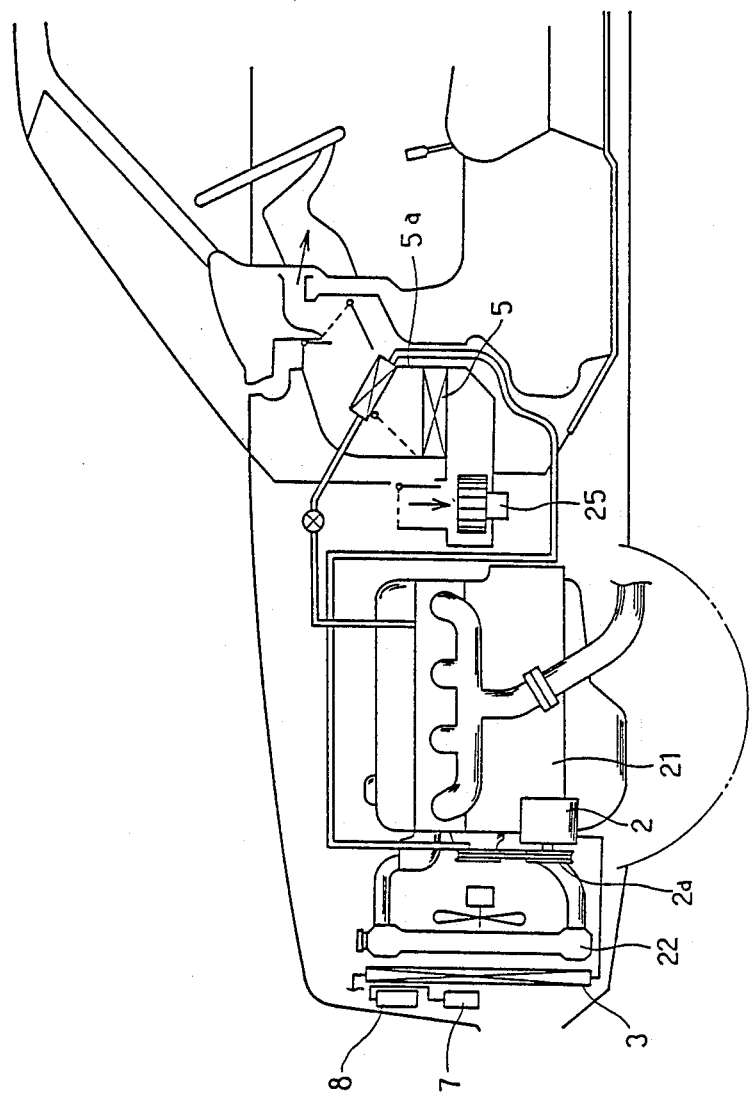
FIG. 2 shows the arrangement of the automotive air conditioner according to the present invention.

Numeral 2 in FIG. 1 designates a compressor for sucking compressing and discharging a non-azeotropic mix-type refrigerant. The compressor 2 is mounted on an automotive engine as shown in FIG. 2, so that the driving force of the engine 21 is transmitted to the compressor 2 through a belt and an electric clutch 2a. The non-azeotropic mix-type refrigerant of the present invention uses R13, R14 or R22 as the refrigerant which has the lower boiling point and the refrigerant of R134a, R142b or R12 is used as the refrigerant which has the higher boiling point than the other type of refrigerant.

Numeral 3 designates a condenser into which a pressurized non-azeotropic mix-type refrigerant is introduced and the refrigerant is condensed therein. The condenser 3 is mounted within an automotive engine room at the front end thereof as shown in FIG. 2. A radiator 22 is provided behind the condenser 3. The liquid phase refrigerant condensed within the condenser 3 is then introduced into an expansion means 4 so that the pressure and the temperature of the refrigerant are decreased when the refrigerant passes through the expansion means 4. A capillary tube is used as the expansion means 4. A three flow type valve 9 is provided down stream of the expansion means 4. The valve 9 changes the refrigerant flow between a first condition wherein the refrigerant flows toward an evaporator 5 and a second condition wherein the refrigerant flows toward a cooling means 8. When the valve 9 turns to the second condition, the refrigerant flows to the cooling means 8 through a conduit 30 then flows toward to the evaporator 5 through a conduit 31 and a check valve 11. The check valve 11 can allow the refrigerant to flow only from the conduit 31 to the evaporator 5 and prohibit the reverse flow of the refrigerant.

The evaporator 5 is mounted within a cooling case 5a for receiving a cooling air generated by a cooling fan 25 as shown in FIG. 2. Since the refrigerant is evaporated within the evaporator 5, the air passing through the evaporator 5 is cooled for cooling the automotive compartment.

The evaporated refrigerant is then introduced into the compressor 2 through an accumulater 6. The refrigerant is separated to a liquid phase and a gas phase within the accumulater 6 and only the ,gas phased refrigerant is introduced into the compressor 2. Since the total amount of the refrigerant circulating the circuit is varied according to the required faculty of the air conditioner, the liquid phase refrigerant is accumulated within the accumulater 6 for compensating the variation of the total amount of the refrigerant circulating the refrigerant circuit.

One end of a separating conduit 32 is connected to a main refrigerant circuit between the condenser 3 and the expansion means 4. A first pressure reducing means 12a is provided within a conduit 32 so that the refrigerant becomes a gas and liquid phase after the refrigerant passes through the first reducing means 12a, and the gas and liquid phase refrigerant is introduced into a rectifying means 7 through the conduit 32. Since the refrigerant of the present embodiment is non-azeotropic mix-type refrigerant, the percentage of the lower boiling point refrigerant is rather high in the gas phase refrigerant, and the percentage of the higher boiling point refrigerant is rather high in the liquid phase refrigerant.

Figure 3:
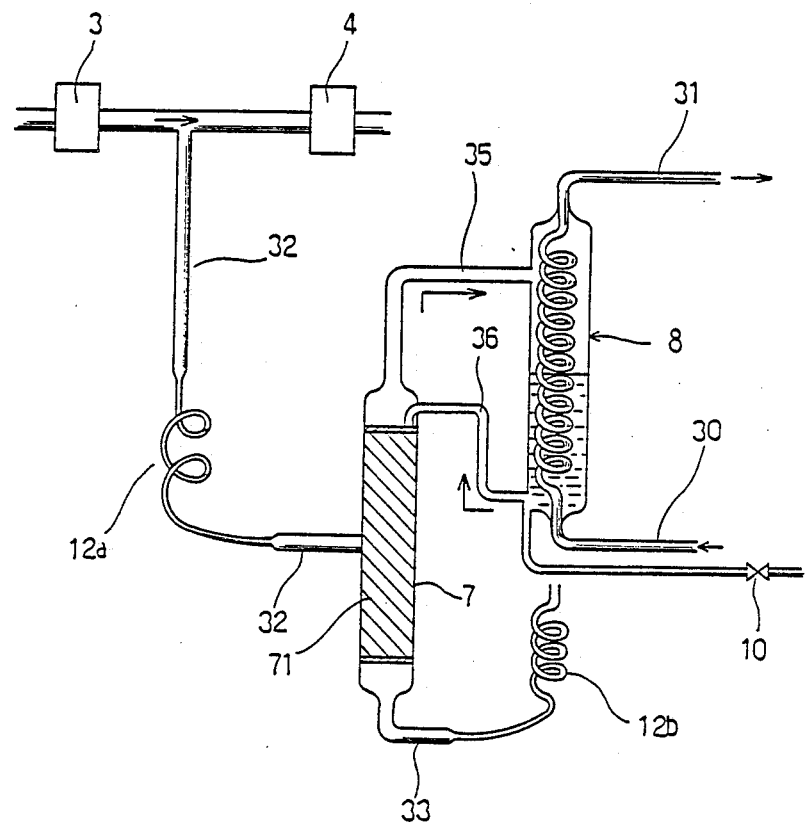
FIG. 3 shows a separating means of the refrigerant circuit shown in FIG. 1.

One end of a rectifying conduit 35 is connected to the rectifying means 7 as shown in FIG. 3, so that the gas phase refrigerant including high percentage of the lower boiling point refrigerant is introduced into the cooling means 8 through the rectifying conduit 35. Since the low temperature refrigerant passes through the cooling means 8 through the conduit 30, the gas phase refrigerant introduced from the rectifying conduit 35 is cooled and condensed within the cooling means 8. One end of a rectifying conduit 36 is opened at the lower portion of the cooling means 8, and another end of the rectifying conduit 36 is connected to the rectifying means 7, so that the condensed refrigerant returns to the rectifying means 7 through the rectifying conduit 36. Since the percentage of the lower boiling point refrigerant contained in the conduit 36 is rather high and since the condensed refrigerant returning to the rectifyoing means 7 is then mixed to the gas phase refrigerant within the rectifying means 7, the refrigerant returning to the rectifying means 7 through the conduit 36 increases the percentage of lower boiling point refrigerant within the rectifying means 7. Accordingly, the rectifying means 7 can separate the lower boiling point refrigerant from the refrigerant by cooperating with the cooling means 8, and the refrigerant containing high percentage of the lower boiling point refrigerant can be accumulated within the cooling means 8. Since a filling object 71 is provided within the rectifying means 7, the refrigerant returned to the rectifying means 7 from the conduit 36 drops within, the rectifying means 7 by contacting with the filling object 71. As the lower boiling point refrigerant separated from the non-azeotropic mixed-type refrigerant, the refrigerant falling toward the bottom portion of the rectifying means 7 does not contain much percentage of the lower boiling point refrigerant. In other words, the higher boiling point refrigerant flows toward the conduit 33. The conduit 33 connects to the main refrigerant circuit at a point upstream of the valve 9. A second pressure decreasing means 12b is provided within the conduit 33 for reducing the pressure of the refrigerant passing through the conduit 33. Thereby the pressure of the refrigerant downstream of the second pressure reducing means 12b is adjusted to the pressure of the refrigerant downstream of the expansion means 4.

The operation of the automotive air conditioner of the present embodiment is described hereinafter. The lower boiling point refrigerant is required to circulate the main refrigerant circuit comprised of the compressor 2, condenser 3, the expansion means 4 and the evaporator 5 when the automotive air conditioner needs a high capacity. Since the lower boiling point refrigerant reduces the volume/ weight ratio, the lower boiling point refrigerant increases the total amount of the circulating refrigerant, so that the lower boiling point refrigerant increases the cooling capacity of the refrigerant circuit. Therefore, the lower boiling point refrigerant is required to circulate the main refrigerant circuit, and there is no needs for separating the lower boiling point refrigerant. In other words, the operation of the rectifying means 7 and the cooling means 8 is not required. The valve 9 turns to the first condition so that the refrigerant passing through the expansion means 4 flows toward the evaporator 5, and the on-off valve 10 opens the conduit. Both the valve 9 and the on-off valve 10 are controlled by a controlling unit 15.

After the automotive air conditioner operates for a while and the automotive air conditioner is not required to have such high capacity, the controlling unit 15 outputs an electric signal for switching the valve 9 and the on-off valve 10. The valve 9 turns to the second condition thereby and the refrigerant passing through the expansion valve 4 flows toward the cooling means 8. The on-off valve 10 shuts the conduit for containing the lower boiling point refrigerant within the cooling means 8. In other words, the on-off valve 10 prohibits the introduction of the lower boiling point refrigerant to the main refrigerant circuit. Since every refrigerant passing through the expansion means 4 flows to the cooling means 8, the cooling capacity of the cooling means 8 is increased as high as 1500Kcal/h , for example, therefore the cooling means 8 and the rectifying means 7 separate the lower boiling point refrigerant in less than 3 minutes. The total amount of the circulating refrigerant is decreased when the refrigerant passes through the cooling means, thereby the cooling capacity of the evaporator 5 is decreased when the valve 9 turns to the second condition. However, the valve 9 turns to the second condition when the automotive air conditioner is not required high cooling capacity, the decrement of the cooling capacity of the evaporator 5 dose not cause any substantial disadvantages. Furthermore, since the cooling capacity of the cooling means 8 of the present invention is high enough, the separation of the lower boiling point refrigerant is completed within the short period, so that the period while the valve 9 is required to be turned to the second condition is also short period.

The control unit 15 outputs the signal to the on-off valve 10 for opening the valve 10 when the automotive air conditioner is required to have high cooling capacity such conditions that the room temperature is increased or the sunshine becomes strong. The lower boiling point refrigerant accumulated within the cooling means 8 flows to the evaporator 5 through the check valve 11 when the valve 10 opens the conduit. Since the pressure of the refrigerant within the cooling means 8 is higher than the pressure of the refrigerant upstream of the evaporator 5 by the pressure difference caused by the second pressure reducing means 12b, the refrigerant within the cooling means 8 can flow to the evaporator 5 quickly. Accordingly, the amount of the total refrigerant introduced into the evaporator 5 is increased when the valve 10 opens the conduit. The refrigerant may not evaporate completely within the evaporator 5, so that liquid phase refrigerant may flow downstream of the evaporator 5. The liquid phase refrigerant, however, is accumulated within the accumulater 6, and liquid phase refrigerant is prevented from being introduced into the compressor 2.

Figure 4:
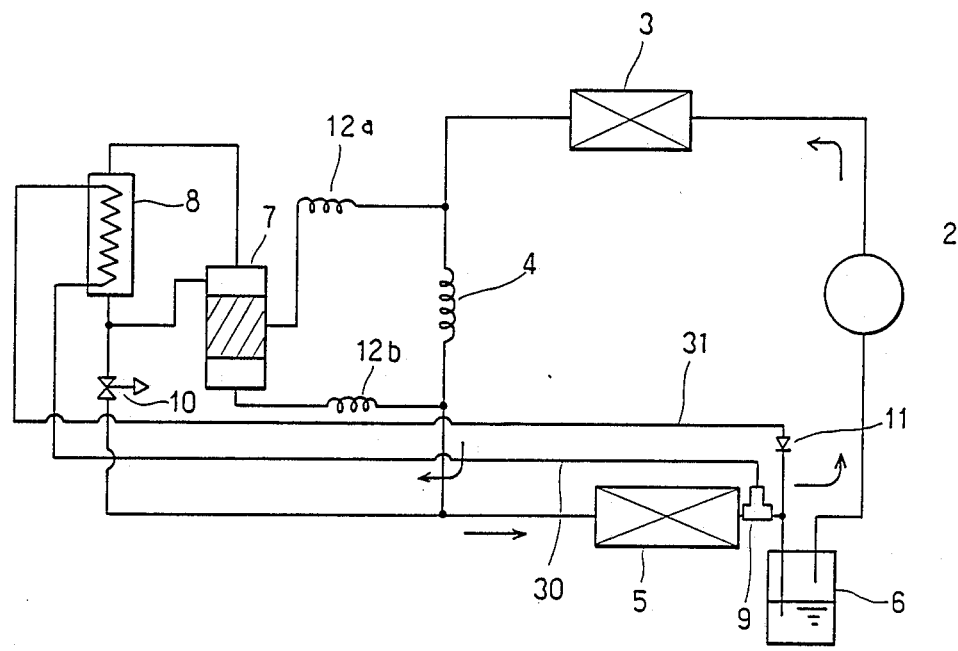
FIGS. 4, 5, and 6 are diagrams of the refrigerant circuit according to the present invention.

FIG. 4 shows another embodiment of the present invention, the valve 9 of this embodiment is provided downstream of the evaporator 5 so that the refrigerant downstream of the evaporator 5 is introduced into the cooling means 8 through the conduit 30. The refrigerant passing through the cooling means 8 is returned to the main refrigerant circuit through the conduit 31 and the check valve 11. The conduit 31 is connected to the main refrigerant circuit between the valve 9 and the accumulater 6. Since the refrigerant of the main refrigerant circuit always passes through the evaporator 5 even when the valve 9 turns to the second condition wherein the refrigerant passes through the cooling means 8, the cooling capacity of the evaporator 5 is not decreased. The cooling means 8 shown in FIG. 4 should need larger volume than the cooling means shown in FIG. 1, because the gas phase refrigerant passes through the cooling means 8 shown in FIG. 4.

Figure 5:
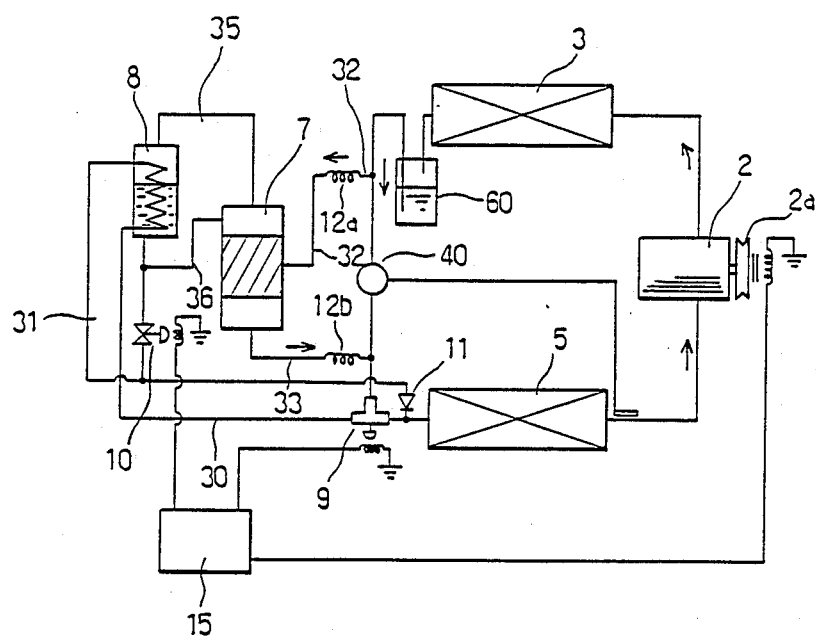

FIG. 5 shows the other embodiment of the present invention. The expansion means 40 of this embodiment varies the opening area thereof in accordance with the super heated degree of the refrigerant downstream of the evaporator 5. The refrigerant circuit shown in FIG. 5 employs a receiver 60 instead of the accumulater 6. The receiver 60 is provided downstream of the condenser 3, and the receiver 60 compensates the variation of the total amount of the refrigerant circulating the refrigerant circuit.

Figure 6:
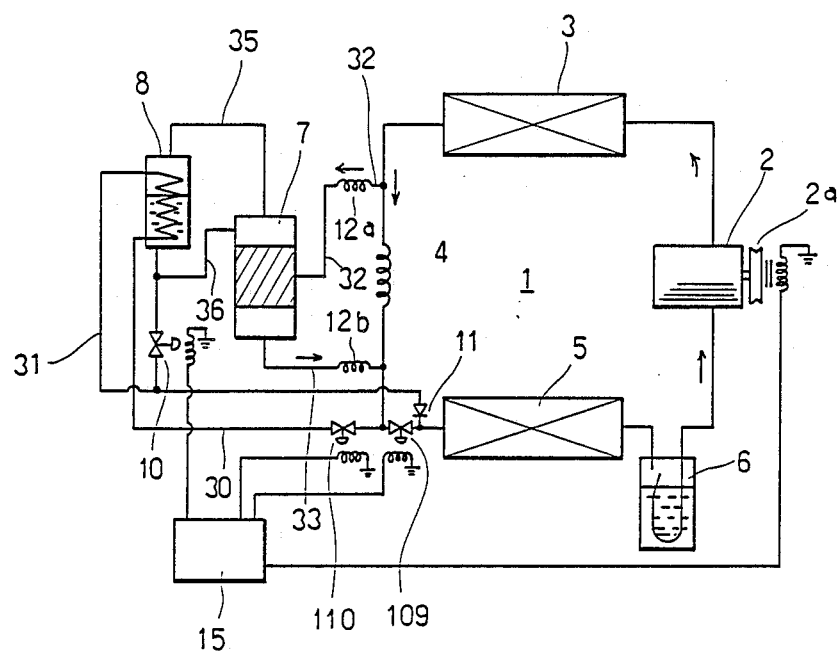

FIG. 6 shows still other embodiment of the present invention. The embodiment shown in FIG. 6 employs a couple of on-off valves 109 and 110 instead of three flow valve.

What is claimed is:

1. An automotive air conditioner using a non-azeotropic mixed-type refrigerant of a higher boiling point refrigerant and a lower boiling point refrigerant comprising;
   a compressor sucking, compressing and discharging the refrigerant,
   a condenser condensing the refrigerant discharged from said compressor,
   an expansion means provided downstream of said condenser for expanding the refrigerant passing therethrough,
   a rectifying means for separating the refrigerant into a gas phase refrigerant wherein the percentage of the lower boiling point refrigerant contained therein is high and a liquid phase refrigerant wherein a percentage of the higher boiling point refrigerant contained therein is high, said rectifying means being connected to a refrigerant circuit between said condenser and said expansion means so that the refrigerant condensed within said condenser is introduced into said rectifying means, and said rectifying means being connected to the refrigerant circuit between said expansion means and said evaporator so that the liquid phase refrigerant separated within said rectifying means is introduced toward said evaporator,
   a cooling means for cooling the gas phase refrigerant separated within said rectifying means and for accumulating the refrigerant wherein the percentage of the lower boiling point refrigerant therein is high, said cooling means being connected to said rectifying means via an inlet conduit so that the gas phase refrigerant separated within said rectifying means is introduced into an upper portion of said cooling means through said inlet conduit, and said cooling means being connected with said rectifying means via an outlet conduit so that the refrigerant condensed within said cooling means returns to said rectifying means, said cooling means having an heat exchanger therein for cooling the refrigerant introduced from said rectifying means through said inlet conduit, said heat exchanger being connected with the refrigerant circuit downstream of said expansion means and upstream of said compressor so that the low temperature refrigerant circulating in the refrigerant circuit is introduced into said heat exchanger, and
   a control valve means for switching a flow of the refrigerant circulating in the refrigerant circuit into a first condition wherein the refrigerant circulating in the refrigerant circuit is not introduced into said heat exchanger and a second condition wherein the refrigerant circulating in the refrigerant circuit is introduced into said heat exchanger,
   a conduit for connecting said cooling means to the refrigerant circuit, said conduit having an on-off valve means so that the refrigerant condensed and accumulated in said cooling means is introduced into the refrigerant circuit when said on-off valve means opens said conduit.

2. An automotive air conditioner claimed in claim 1, wherein,
   said control valve means is provided downstream of said expansion means and upstream of said evaporator so that the low temperature refrigerant expanded by said expansion means is introduced into said heat exchanger for cooling the refrigerant within said cooling means.

3. An automotive air conditioner claimed in claim 1, wherein,
   said control valve means is provided downstream of said evaporator and upstream of said compressor so that the low temperature refrigerant passing through said evaporator is introduced into said heat exchanger for cooling the refrigerant within said cooling means.

4. An automotive air conditioner claimed in claim 1, wherein,
   said control valve means is a three flow valve.

5. An automotive air conditioner claimed in claim 1, wherein said control valve means is comprised of a couple of on-off valves.

6. An automotive air conditioner claimed in claim 1, further comprising;
   a check valve provided within the conduit which connects an outlet of said heat exchanger to the refrigerant circuit for preventing a backflow from the refrigerant circuit to said heat exchanger.

7. An automotive air conditioner claimed in claim 1, further comprising;
   an accumulator provided downstream of said evaporator and upstream of said compressor for accumulating the refrigerant circulating in the refrigerant circuit and for feeding a gas phase refrigerant to said compressor.

8. Automotive air conditioner claimed in claim 1, further comprising;
   a receiver provided downstream of said condenser and upstream of said expansion mans for accumulating the refrigerant circulating the refrigerant circuit and for outputting a liquid phase refrigerant to said expansion means.

9. An automotive air conditioner claimed in claim 1, further comprising;
   a first pressure reducing means provided within said inlet conduit for preliminarily expanding the refrigerant passing therethrough so that the separation in said rectifying means is prompted.

10. An automotive air conditioner claimed in claim 1, further comprising,
    a second pressure reducing means provided within said outlet conduit for reducing the pressure of the refrigerant passing therethrough so that the pressure of the refrigerant at the connecting portion of said outlet conduit and the refrigerant circuit is adjusted.

* * * * *

UNITED STATES PATENT AND TRADEMARK OFFICE
CERTIFICATE OF CORRECTION

PATENT NO. : 4,961,323

DATED : October 9, 1990

INVENTOR(S) : Kiyoharu KUTSUNA, et al.

It is certified that error appears in the above-identified patent and that said Letters Patent is hereby corrected as shown below:

On the Title page, under item [19],

"Katsuna et al." should read -- Kutsuna et al. --; and
Item [75] should read as follows:
[75] Inventors: Kiyoharu Kutsuna, Anjo; Kenji Ogura, Kariya; Toshio Hirata, Anjo, all of Japan Signed and Sealed this Seventh Day of April, 1992

*Attest:*

HARRY F. MANBECK, JR.

*Attesting Officer*      *Commissioner of Patents and Trademarks*